J. C. MacLACHLAN.
APPARATUS FOR GRANULATING HEAVY SEMI-FLUID MATERIALS.
APPLICATION FILED JUNE 4, 1917.
1,301,288.
Patented Apr. 22, 1919.
3 SHEETS—SHEET 1.
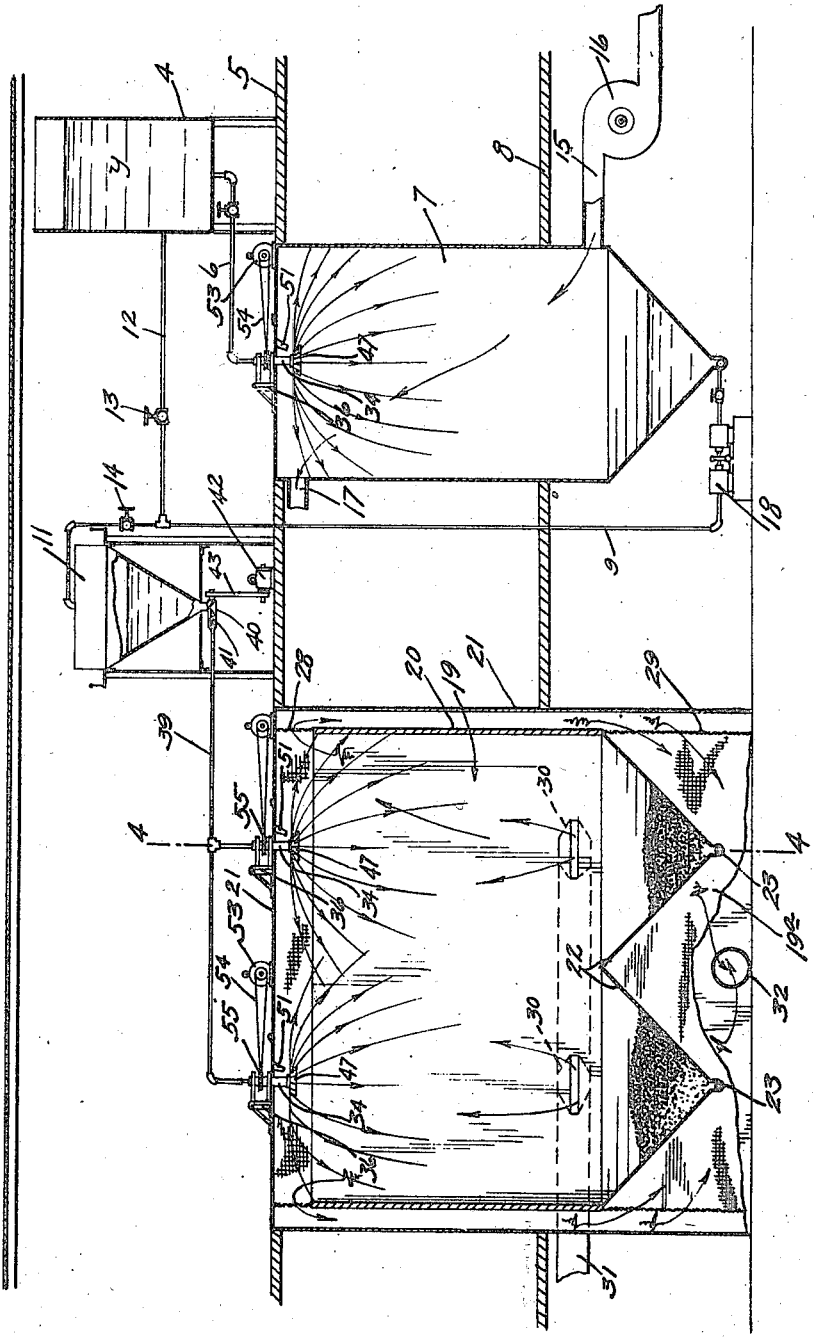

J. C. MacLACHLAN.
APPARATUS FOR GRANULATING HEAVY SEMI-FLUID MATERIALS.
APPLICATION FILED JUNE 4, 1917.
Patented Apr. 22, 1919.
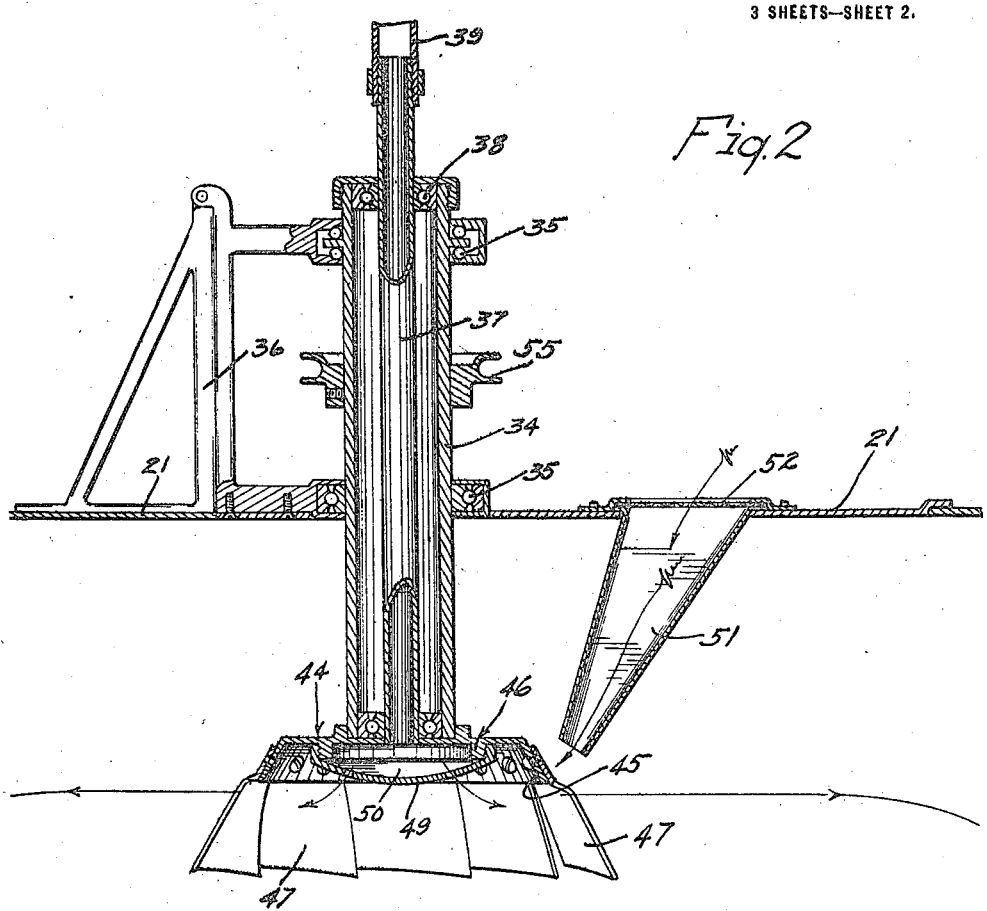
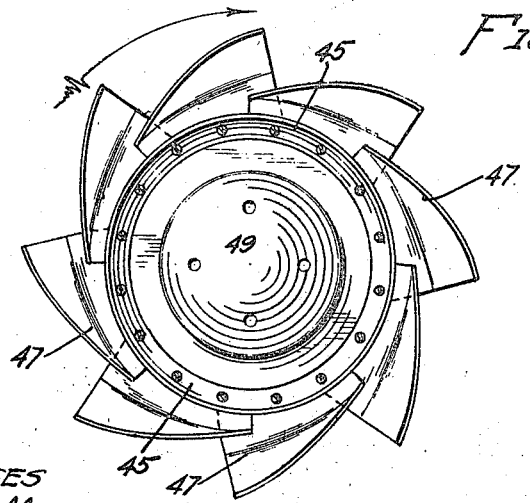
WITNESSES
E. C. Wells
H. L. Opsahl.
INVENTOR
John C. MacLachlan
BY HIS ATTORNEYS

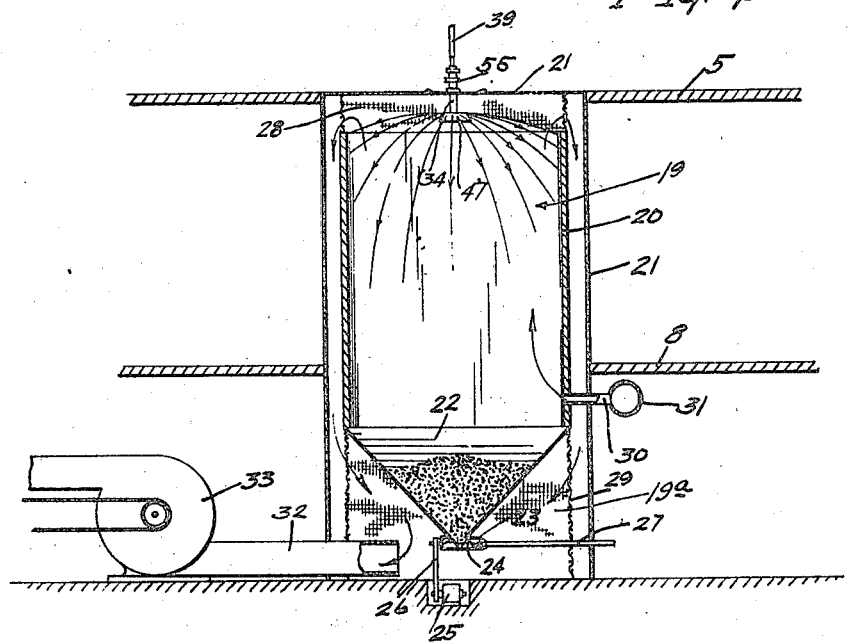
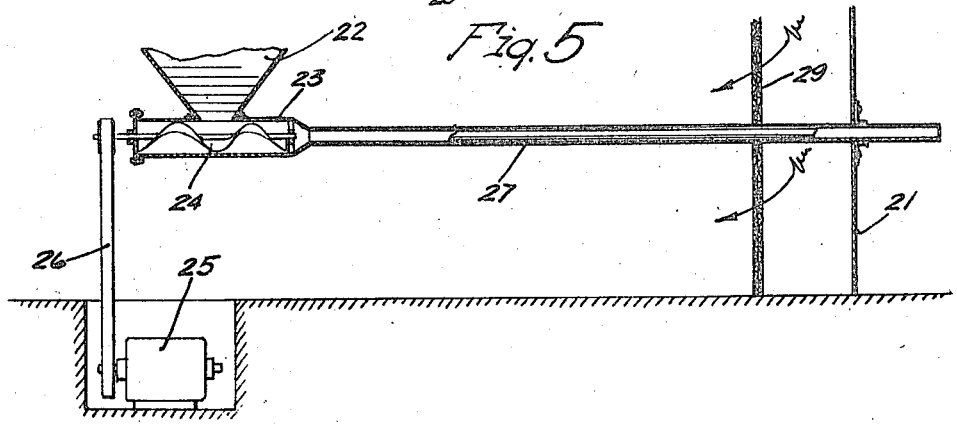

UNITED STATES PATENT OFFICE.

JOHN C. MacLACHLAN, OF ST. PAUL, MINNESOTA.

APPARATUS FOR GRANULATING HEAVY SEMIFLUID MATERIALS.

1,301,288. Specification of Letters Patent. Patented Apr. 22, 1919.

Application filed June 4, 1917. Serial No. 172,589.

*To all whom it may concern:*

Be it known that I, JOHN C. MACLACHLAN, a citizen of the United States, residing at St. Paul, in the county of Ramsey and State of Minnesota, have invented certain new and useful Improvements in Apparatus for Granulating Heavy Semifluid Materials; and I do hereby declare the following to be a full, clear, and exact description of the invention, such as will enable others skilled in the art to which it appertains to make and use the same.

My invention has for its object to provide an improved apparatus for obtaining in granular form, the solid constituents of heavy semi-liquid, viscous, or pasty substances. Particularly, the apparatus is designed for obtaining in granular form, the solid constituents of milk, buttermilk, and various other liquids and of crushed or pulped fruit, vegetables, meats, etc. In obtaining this granular constituent from liquids, such as milk and buttermilk, they are first condensed or reduced to the above noted pasty semi-liquid or semi-solid condition. Fruit, vegetables, and the like, before they are subjected to the apparatus, must be reduced to the above noted semi-liquid or semi-solid condition by crushing, beating or grinding, or other treatment for producing the above noted condition.

The apparatus herein disclosed and claimed is especially adapted for carrying out the improved "method of obtaining dry granular products from semi-fluid materials" disclosed and claimed in my pending application S. N. 115,997, filed August 21, 1916.

The pasty semi-fluid condensed material is subjected to the combined beating and centrifugal throwing action of a rotary so-called centrifugal beater, under the action of which the heavy pasty substance is beaten, cracked, or broken up and thrown in a shower into a chamber through which a hot blast of air is forced, and, by the action of which hot air, the finely broken-up particles are rapidly dried and precipitated in granular form, into the bottom of said chamber.

One of the chief features of the present invention is directed to an improved form of so-called centrifugal beater, under the action of which, the hot air is brought into more thorough action on the pasty substance at the very time that it is being thrown and beaten by the centrifugal beater.

In the accompanying drawings which illustrate the complete apparatus, like characters indicate like parts throughout the several views. Referring to the drawings, Figure 1 is a vertical section showing the complete apparatus;

Fig. 2 is a vertical section showing on a larger scale than in Fig. 1, the centrifugal beater and immediately associated devices;

Fig. 3 is a bottom plan view of the centrifugal beater;

Fig. 4 is a transverse section on the line 4—4 of Fig. 1; and

Fig. 5 is an enlarged view on the same line as Fig. 4, but showing chiefly the feed devices for carrying the precipitated granular material from the hopper of the precipitating chamber.

In the further description of this apparatus, it will be assumed to be used in the treatment of milk. The milk $y$, in this complete apparatus, is placed in a supply tank 4 shown as supported on one of the upper floors 5 in the building. This tank 4 is connected by a valve-equipped pipe 6 to a spraying head located in the upper portion of a condensing tank or chamber 7, which latter, in the arrangement illustrated, extends from the floor 5 down through a lower floor 8 of the building in which the apparatus is installed. The said spraying head, just referred to, is preferably of a character hereinafter more fully described. The hopper-like bottom of the condensing chamber 7 is connected to the lower end of a pipe 9 that extends to an elevated feed hopper 11 shown as supported on the upper floor 5. The upper portion of this pipe 9 is also connected by a return pipe 12 to the milk supply tank $y$. Said pipe 12 has a valve 13, and pipe 9, above said pipe 12, has a valve 14. The hot blast of air is blown into the lower portion of the condensing chamber 7, through a hot air pipe 15 and blower 16. This hot air is drawn off from the upper portion of said condensing chamber 7, through a hot air pipe 17.

The numeral 18 indicates a pump shown as interposed in the lower portion of the pipe 9 for producing the positive flow upward through said pipe.

The precipitation of the granular material takes place in a so-called precipitation chamber 19, preferably formed within the inner shell 20 of a double-walled casing made up of said shell 20 and an outer shell 21, which latter is extended from the floor 5 down through floor 8 to a lower floor level. The lower portion of the precipitating chamber 19 is shown as formed with two hopper-like bottom sections 22, each opening into a feed tube 23 in which works a feed screw 24. The feed screw 24, as shown, is arranged to be driven from a small electric motor 25, through a suitable belt and pulley drive 26. One end of each feed tube 23 connects to a discharge tube 27 that extends to a suitable point of discharge outside of the casing 21. The walls of the inner casing 20 are extended upward to the top of the outer casing 21 by a fine screen 28 of wire or coarse fabric, and the walls of said inner casing 20 are extended downward to the bottom of said outer casing 21 by similar reticulate material 29.

Hot air is blown into the precipitation chamber 19, as shown, at two different points, through branch pipes 30 that lead from a hot air supply pipe 31. The numeral 32 indicates a hot air draw-off pipe that leads from the chamber 19ª which is below the hopper-like bottoms 22, and extends to a suction fan 33.

Located in the upper portion of the precipitating chamber 19, one above each hopper bottom 22, is a centrifugal beater of novel construction and arrangement, the preferred form of which is as follows:

The numeral 34 indicates an upright tubular spindle that is extended through the top plate of the outer casing 21, and, by means of suitable ball bearings 35, is journaled to a bearing bracket 36 rigidly secured on top of the casing 21. A non-rotary tube 37 is extended axially through the rotary spindle 34, and ball bearings 38 are preferably interposed between the said tube 37 and the upper and lower ends of said spindle.

The upper ends of the tubes 37 are connected to a supply pipe 39 that leads from a feed tube 40, which, in turn, is connected to the bottom of the hopper 11. Working in the feed tube 40 is a feed screw 41 which, as shown, is driven from a small electric motor 42 through a suitable belted pulley drive 43.

Secured to the lower end of each rotary spindle 34 is a disk-like head 44 preferably having an oblique depending marginal flange 45 and a threaded annular flange 46. Rigidly secured to the flange 45 is a plurality of beater blades 47. These beater blades not only diverge downwardly from the axis of rotation, but extend circumferentially on lines that are eccentric to said axis. Moreover, the edges of the said beater blades circumferentially overlap, and in respect to the direction of rotation of the beater head (see arrow Fig. 3), the front edges of the said blades are radially further outward than the rear edges, so that there are air passages between the overlapping edges of the said blades. This is important.

Secured to the threaded flange 44 is a perforated nozzle plate 49 which coöperates with the head plate 44 to form a cavity 50. Here it is important to note that the discharge perforations in the nozzle plate 49 are eccentrically located in respect to the axis of rotation so that the heavy material or condensed substance will, under high rotation and centrifugal force, be thrown violently outward and against the beater blades 47.

The numeral 51 indicates a cold or fresh air intake tube which leads through the top plate of the casing 21 and terminates at its lower end close to the rim portion of the rotary centrifugal beater. The outer end of this fresh air tube 51 is preferably covered by a fine screen 52.

The material to be treated, which we have assumed to be milk, will flow by gravity through the pipe 6, and will be discharged in a shower from the spraying head that is at the delivery end of pipe 6 and located in the upper portion of the condensing chamber 7. This spraying head may be, and preferably is, of the same character as those located in the precipitating chamber and above fully described, and hence, the parts thereof are indicated by the same numerals. All of these rotary heads are driven at a very high speed and this is preferably accomplished by small electric motors 53 that drive belts 54 that run over grooved sheaves 55 on the rotary spindles 34.

The shower of milk from the spraying head within the condensing chamber 7 will fall through the upwardly moving hot blast of air and much of the moisture will be carried off by this hot air so that the liquid which is precipitated at the bottom of the chamber 7 will be much condensed even by one precipitation through this hot air. It should, however, be passed through the hot air several times and until it is reduced to what, as above stated, may be treated as a heavy pasty condition or to a condition much like that of wet dough. This condition may also be treated as a semi-fluid condition, that is, it will not flow by gravity through tubes or pipes of ordinary size, but will, nevertheless, settle and seek an approximate level at the bottom of the condensing chamber. From the hopper-like bottom of condensing chamber 7, the pasty or semi-fluid milk will by pump 18 be forced upward through pipe 9. If valve 14 be then closed, and valve 13 opened, this condensed milk or material will be returned to supply tank y, and from thence may again be fed through pipe 6 and spraying head into the upper portion of condensing tank, and thus further condensed until it has been reduced to the required pasty or heavy semi-liquid condition. Valve 13 being then closed and valve 14 opened, this heavy pasty material will be delivered into hopper 11 and from thence by feed screw 24 forced through pipe 39 and tubes 37 into chamber 50 of the centrifugal beaters located in the upper portion of the precipitating chamber 19. These centrifugal beaters, it is important to note, are mounted to rotate on vertical axes. Under pressure produced from the feed screw 24, the pasty material will be forced outward through the perforations or nozzle plate 49, and under the action of centrifugal force will be thrown violently outward and against the beater blades 47. These beater blades, because of the extremely high speed at which the beaters are rotated, and because of the distance of the said blades from the axis of rotation, have very high peripheral velocity and will strike the pasty or semi-solid substance with great force and, moreover, each particle of the pasty material will be repeatedly subjected to impacts or blade strokes which will crack up and break the particles, while at the same time, subject the same to quite violent blasts of hot air. The sort of fan formation of the beater blades causes the hot air to move under great velocity around and between the beater blades and the combined beating at high velocity and rapid drying action of the forced blast of hot air serves to reduce the pasty substance almost instantly to a finely divided granular form. This granular formation is not microscopic, but may be observed with the naked eye and may be felt between the fingers. It is much preferable to an impalpable powder formation such as has been hitherto produced by spraying milk or other material, either in its natural, or slightly condensed condition through a hot blast of air. The powder or dust form of the precipitated material will not readily dissolve in water, but like fine wheat flour, for example, requires great care in mixing and stirring to prevent it from forming dry cakes that will not absorb the water by capillary attraction. On the contrary, the granular formation will quickly dissolve in water and because of its capillary attraction will, even when applied in the water in quantities, quickly absorb water and be dissolved thereby.

In Fig. 1, the depending grooved lines indicate the way in which the shower of granulated or fine particles fall in sort of umbrella formations, from the centrifugal beaters through the upwardly moving hot currents of air into the bottoms of the precipitating chamber.

Under rotation of the centrifugal beaters, some fresh air will be drawn continuously into the top of the precipitating chamber through the fresh air tubes 51. This fresh air will be much cooler than the air within the precipitating chamber and will be delivered directly against the blades of the rotary beaters, thereby tending to cool the same and, moreover, supplying fresh air rich in oxygen to the broken or granulated particles.

What I claim is:

1. An apparatus for granulating pasty semi-fluid materials, comprising a rotary discharge head arranged to throw the material ejected therefrom, outward under the action of centrifugal force, a beater rotatable about said discharge head, in position to strike and beat the material ejected from and thrown outward by said discharge head, and means for rotating said head and beater at high speed.

2. An apparatus for granulating pasty semi-fluid materials, comprising a rotary discharge head having a discharge orifice located eccentric to its axis of rotation, whereby material ejected therefrom will be thrown outward by centrifugal force, beater blades, rotatable about said discharge head, in position to strike and beat the material ejected from and thrown outward by said discharge head, and means for rotating said head and beater blades at high speed.

3. An apparatus for granulating pasty semi-fluid materials, comprising a precipitating chamber, means for producing forced circulation of air through said chamber, a rotary discharge head positioned to discharge within said chamber and provided with a discharge orifice eccentrically located in respect to its axis of rotation, and beater blades secured to said discharge head but spaced outward therefrom in position to beat the pulverized material discharged from and thrown outward by said beater head, means for supplying the pasty material to said discharge head, and means for rotating said head and beater blades at high speed.

4. An apparatus for granulating pasty semi-fluid materials, comprisng a rotary discharge head having a discharge orifice located eccentric to its axis of rotation, whereby material ejected therefrom will be thrown outward by centrifugal force, beater blades rotatable about said discharge head, in position to strike and beat the material ejected from and thrown outward by said discharge head, and means for rotating said head and beater blades at high speed, the said beater blades being in overlapped arrangement, extending on lines that are eccentric to the axis of rotation of said head, the radially outermost extremities of said blades being forward in respect to the direction of rotation of said head.

5. An apparatus for granulating pasty semi-fluid materials, comprising a precipitating chamber, means for producing forced circulation of air through said chamber, a rotary discharge head positioned to discharge within said chamber and provided with a discharge orifice eccentrically located in respect to its axis of rotation, and beater blades secured to said discharge head but spaced outward therefrom, in position to beat the pulverized material discharged from and thrown outward by said beater head, means for supplying the pasty material to said discharge head, and means for rotating said head and beater blades at high speed, the said casing having a fresh cold air intake port independent of said air circulating means, arranged to direct cold air directly onto the said beater blades to cool the same.

6. An apparatus for granulating pasty semi-fluid materials, comprising a rotary discharge head having a discharge orifice located eccentric to its axis of rotation, whereby material ejected therefrom will be thrown outward by centrifugal force, beater blades rotatable about said discharge head, in position to strike and beat the material ejected from and thrown outward by said discharge head, and means for rotating said head and beater blades at high speed, the said beater blades being in overlapped arrangement, extending on lines that are eccentric to the axis of rotation of said head, the radially outermost extremities of said blades being forward in respect to the direction of rotation of said head, and a casing having a fresh cold air intake port independent of said air circulating means, arranged to direct cold air directly onto the said beater blades, to cool the same, the said beater blades, under rotation, having a fan action which draws fresh air inward through said fresh air intake port.

In testimony wherof I affix my signature in presence of two witnesses.

JOHN C. MacLACHLAN.

Witnesses:
MAY A. SMITH,
F. D. MERCHANT.